United States Patent
Spaulding et al.

(10) Patent No.: US 9,976,616 B2
(45) Date of Patent: May 22, 2018

(54) PAWL RETURN SPRING WITH INACTIVE COILS

(71) Applicant: Ford Global Technologies, LLC, Dearborn, MI (US)

(72) Inventors: Todd Curtis Spaulding, Ann Arbor, MI (US); Susan Wyatt, Milford, MI (US); Mihir M. Pai, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

(21) Appl. No.: 15/215,637

(22) Filed: Jul. 21, 2016

(65) Prior Publication Data

US 2018/0023650 A1    Jan. 25, 2018

(51) Int. Cl.
| | | |
|---|---|---|
| *B60T 1/00* | (2006.01) | |
| *F16F 1/06* | (2006.01) | |
| *B60T 1/06* | (2006.01) | |
| *F16H 63/34* | (2006.01) | |
| *F16H 63/48* | (2006.01) | |

(52) U.S. Cl.
CPC .............. *F16F 1/065* (2013.01); *B60T 1/005* (2013.01); *B60T 1/062* (2013.01); *F16H 63/3425* (2013.01); *F16H 63/3416* (2013.01)

(58) Field of Classification Search
CPC .................................................. F16H 63/3425
See application file for complete search history.

(56) References Cited

U.S. PATENT DOCUMENTS

| | | | | | |
|---|---|---|---|---|---|
| 3,116,815 | A | * | 1/1964 | Chapman, Jr. .......... | B60T 1/005 188/106 R |
| 3,280,806 | A | * | 10/1966 | Iskenderian ............ | F01L 1/183 123/90.47 |
| 4,671,133 | A | * | 6/1987 | Yamada .................. | B60T 1/005 188/31 |
| 5,170,869 | A | * | 12/1992 | Svab ....................... | B60T 1/005 188/31 |
| 5,630,339 | A | * | 5/1997 | Tuday ..................... | B60T 1/005 192/219.5 |

FOREIGN PATENT DOCUMENTS

CN           203395168 U      1/2014

* cited by examiner

*Primary Examiner* — Robert W Hodge
*Assistant Examiner* — Ryan P Dodd
(74) *Attorney, Agent, or Firm* — James Dottavio; Brooks Kushman P.C.

(57) ABSTRACT

A pawl return spring includes a surface contacting portion adapted to contact a transmission housing. The surface contacting portion includes a first connection region and a second connection region opposite the first connection region. The pawl return spring includes an active coil region connected to the first connection region and disposed about a central longitudinal axis to provide torsional effort to the system. The pawl return spring also includes an inactive coil region connected to the second connection region and disposed about the central longitudinal axis that does not provide torsional effort to the system.

13 Claims, 5 Drawing Sheets

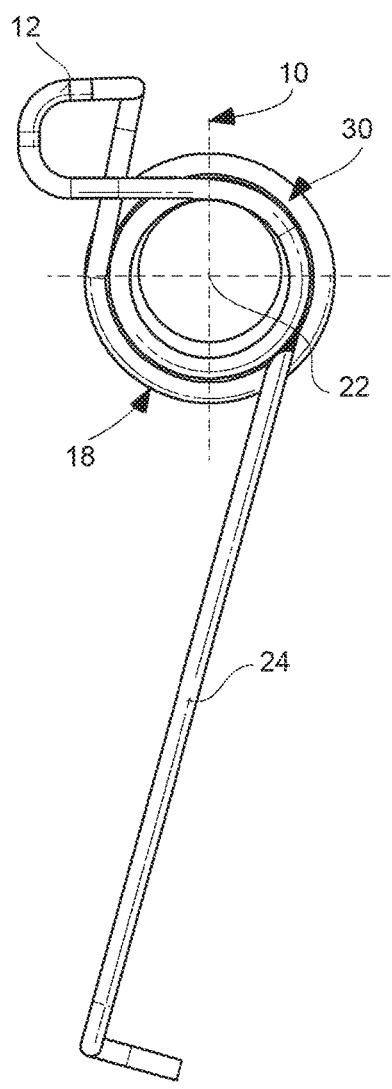
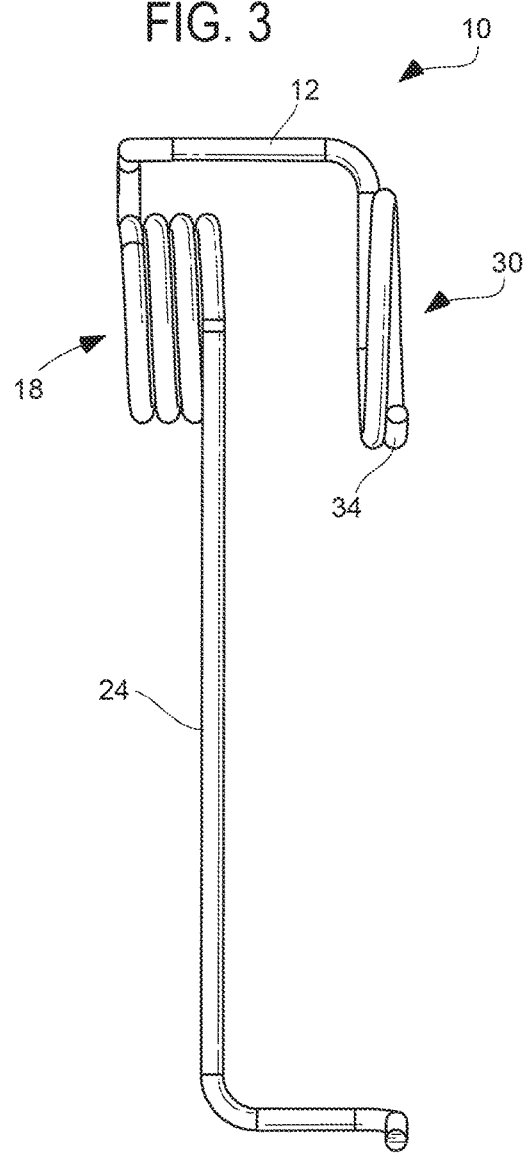

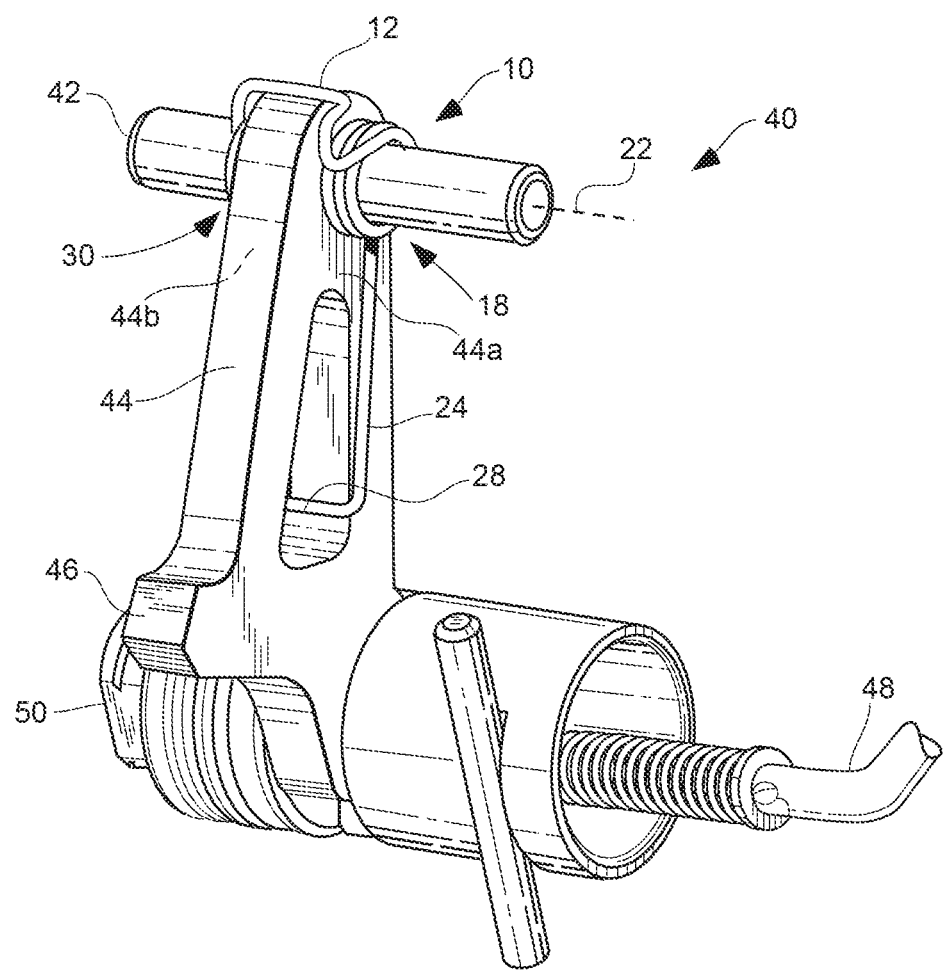

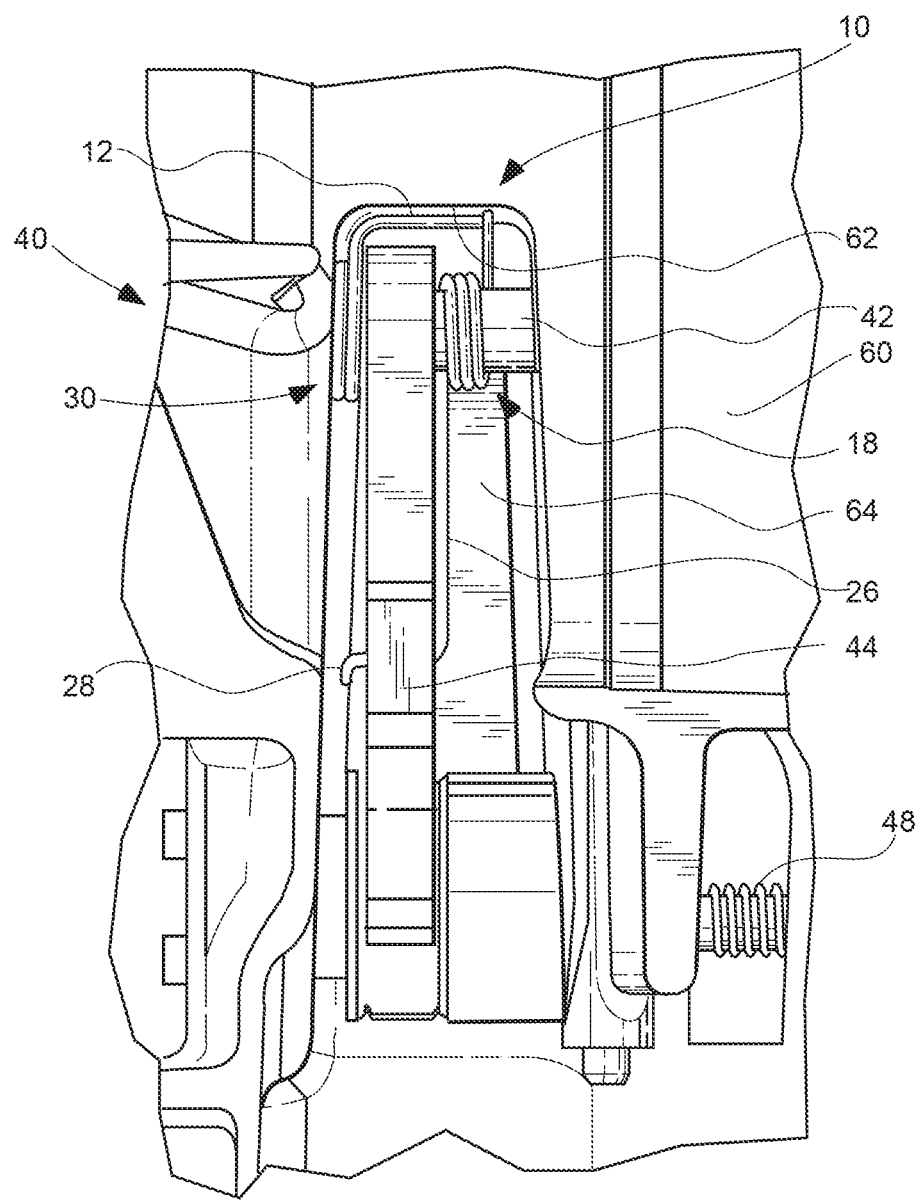

PAWL RETURN SPRING WITH INACTIVE COILS

TECHNICAL FIELD

This disclosure relates to park brake assemblies for automatic transmissions for automotive vehicles. More particularly, this disclosure relates to pawl return spring with inactive coils for use in park brake assemblies for automatic transmissions for automotive vehicles.

BACKGROUND

Automotive automatic transmissions typically include a park brake assembly to maintain a vehicle in a "parked" position or state. Park brake assemblies often include a rotatable member (or "park pawl") that is rotatable about a pivot shaft. A park pawl may be selectively engaged by a park rod when the transmission of the vehicle is shifted into the "park" position. When the park rod engages the park pawl, the park pawl pivots or rotates into a position where it is disposed between a pair of teeth on a park gear, thereby substantially preventing the park gear and corresponding output shaft from further rotating. This constrains the vehicle against movement under gravity when the vehicle is parked on a sloped surface, for example.

When a vehicle is shifted into a position other than the "park" position, a return spring biases the park pawl away from the park gear and out of engagement with the teeth of the park gear. The return spring also serves to ensure the park pawl stays disengaged from the parking gear when the vehicle is not in "park." This may be accomplished through torsion created in active coils of the return spring by grounding one end of the return spring at a position on the park pawl, and grounding the other end of the return spring at a pin or other grounded surface within the transmission housing. In this way, the active coils of the grounded return spring bias the park pawl away from the park gear during operation of the vehicle while it is not in "park."

SUMMARY

In addition to active, biasing coils, a return spring is provided with a positioning and alignment feature to aid in proper assembly of the park pawl during assembly of automotive transmissions.

A pawl return spring includes a surface contacting portion adapted to engage a transmission housing. The surface contacting portion has a first connection region and a second connection region opposite the first connection region. The pawl return spring includes an active coil region connected to the first connection region and disposed about a central longitudinal axis. The pawl return spring also includes an inactive coil region connected to the second connection region and disposed about the central longitudinal axis.

A park assembly includes a pawl rotatable about a pivot shaft. The park assembly also includes a pawl return spring having a surface contacting portion. The pawl return spring includes an active coil region connected to the surface contacting portion and disposed about the pivot shaft at a first side of the pawl. The pawl return spring also includes an inactive coil region connected to the surface contacting portion and disposed about the pivot shaft at a second side of the pawl opposite the first side.

A method for operating a park mechanism includes providing a pawl rotatable about a pivot shaft. The method also includes using a pawl return spring to bias the pawl in a disengagement rotary direction. The pawl return spring includes an active coil region disposed about the pivot shaft at a first side of the pawl and an inactive coil region disposed about the pivot shaft at a second side of the pawl.

BRIEF DESCRIPTION OF THE DRAWINGS

FIG. 2 is a side view of the pawl return spring of FIG. 1.
FIG. 3 is a front view of the pawl return spring of FIG. 1.
FIG. 4 is a perspective rear view of a park brake assembly for an automatic transmission.
FIG. 6 is a rear view of the park brake assembly of FIG. 4 shown within a portion of a transmission housing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
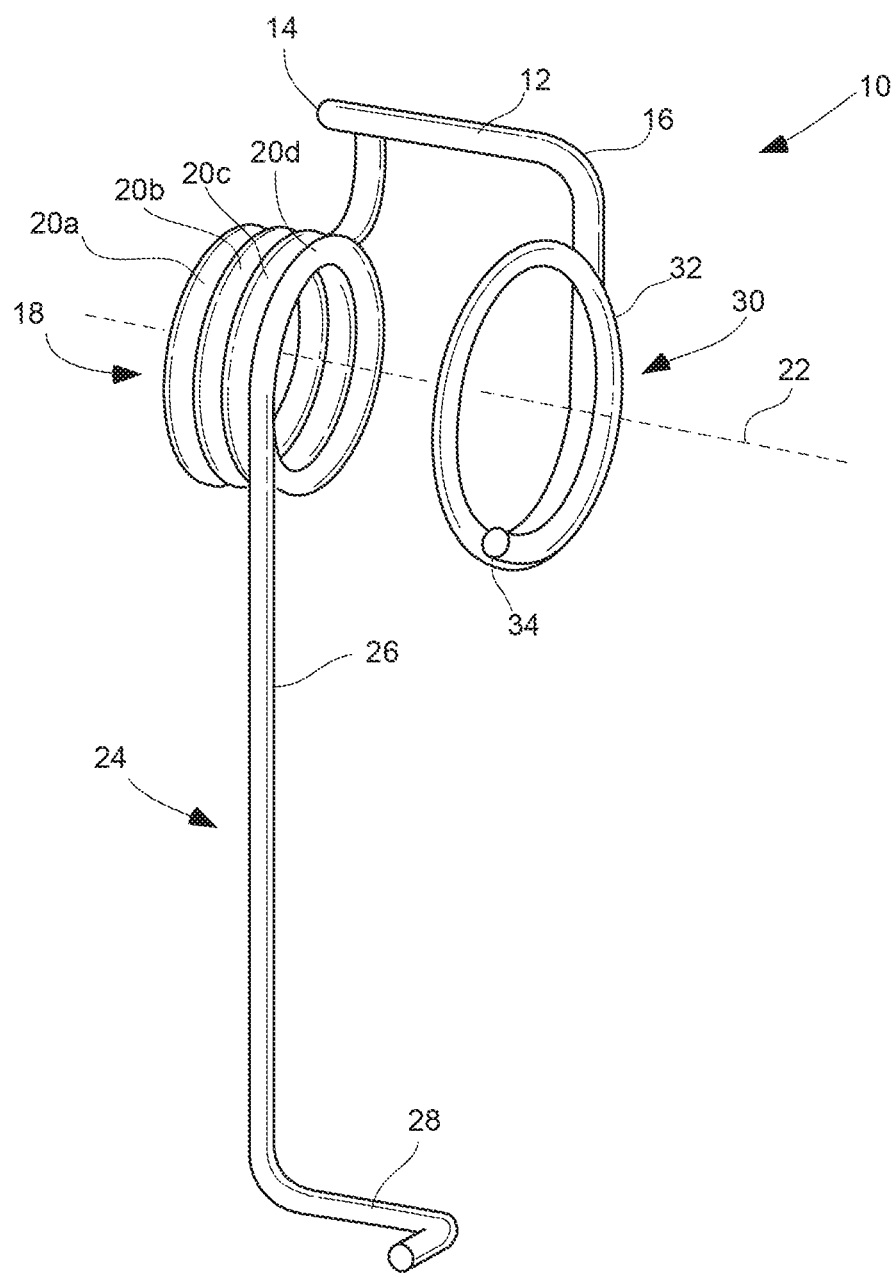
FIG. 1 is a perspective view of a pawl return spring.

Referring to FIGS. 1-3, a return spring 10 includes a surface contacting portion 12, an active coil region 18, a pawl engagement member 24, and an inactive coil region 30. As will be apparent, the surface contacting portion 12 and the pawl engagement member 24 provide the active coil region 18 with first and second reaction points, respectively, thereby grounding the active coil region 18. The inactive coil region 30, however, is not provided with a second reaction point, and therefore is not grounded. As will be apparent, the inactive coil region 30 improves installation of the return spring 10 within a transmission housing. The inactive coil region 30 also aids in maintaining proper alignment of components of a park assembly within the transmission housing.

As shown, for example, in FIGS. 1 and 3, the surface contacting portion 12 of the return spring 10 may be an elongated portion extending between a first connection region 14 and a second connection region 16. However, the surface contacting portion 12 may take any shape suitable to engage a transmission surface to provide a first reaction point, as discussed in greater detail elsewhere herein.

The active coil region 18 is connected to the first connection region 14 of the surface contacting portion 12. In a preferred approach, the active coil region 18 is a torsion spring that includes one or more complete or partial helical coils 20a, 20b, 20c, 20d extending about a central longitudinal axis 22.

The pawl engagement member 24 includes an elongated portion 26 that extends from the active coil region 18. The pawl engagement member 24 also includes an engaging portion 28. As shown, for example, in FIGS. 1 and 3, the engaging portion 28 is preferably a hook-shaped portion. However, the engaging portion 28 may take any shape suitable to engage a park pawl to provide a second reaction point, as discussed in greater detail elsewhere herein.

The active coil region 18 is "active" in that, in a transmission, the active coil region 18 deflects under load; i.e., the active coil region 18 is grounded. This is because the active coil region 18 is fixed at two reaction points: the first reaction point at the surface contacting portion 12, and the second reaction point at the engaging portion 28 of the pawl engagement member 24. In this way, an externally applied torque applied to the pawl engagement member 24 causes the coils 20a, 20b, 20c, 20d of the active coil region 18 to deflect due to bending stresses.

The inactive coil region 30 is connected to the second connection region 16 of the surface contacting portion 12. The inactive coil region 30 may include, for example, one or more complete or partial coils 32. As shown in FIGS. 1-3, the coil 32 of the inactive coil region 30 extends about the central longitudinal axis 22 such that the inactive coil region 30 is coaxial with the active coil region 18. In some approaches, for example, as shown in FIGS. 1-3, the coil 32 of the inactive region 30 may have a greater radius than the coils 20a, 20b, 20c, 20d of the active coil region 18. A larger radius may minimize the opportunity for coil 32 to interfere with a pawl pivot shaft during installation, as described in greater detail elsewhere herein. The inactive coil region 30 terminates at an ungrounded, free end portion 34.

The inactive coil region 30 is "inactive" in that, in a transmission, the inactive coil region 30 does not deflect under load; i.e., the inactive coil region 30 is not grounded. This is because the inactive coil region 30 is fixed at only one reaction point: the first reaction point at the surface contacting portion 12. The free end portion 34 of the coil 32 is not fixed to any surface. In this way, an externally applied torque applied to the pawl engagement member 24 does not cause the coil 32 of the inactive coil region 30 to deflect.

Referring to FIG. 4, a park assembly 40 includes a return spring 10 and a park pawl 44 disposed about a pivot shaft 42. The return spring 10 is disposed about the pivot shaft 42 such that the central longitudinal axis 22 of the active and inactive coil regions 18, 30 is coaxial with a central axis of the pivot shaft 42.

The return spring 10 and the park pawl 44 are arranged such that the active coil region 18 of the return spring 10 is disposed at a first side 44a of the park pawl 44, and the inactive coil region 30 of the return spring 10 is disposed at a second side 44b of the park pawl 44. The surface contacting portion 12 of the return spring 10 extends across the width of the park pawl 44 between the active coil region 18 and the inactive coil region 30. The engaging portion 28 of the pawl engagement member 24 engages a surface of the park pawl 44 (for example, an interior surface of a cutout region of the park pawl 44) to provide the second reaction point.

The park pawl 44 includes a park pawl tooth 46 that projects from the park pawl 44. The park pawl tooth 46 is sized and shaped to engage teeth of a gear (not shown), as is well understood in the art.

The park pawl 44 is rotatably connected to the pivot shaft 42 such that the park pawl 44 rotates about the pivot shaft 42. Rotational movement is imparted to the park pawl 44 by conventional techniques known in the art. For example, a park rod 48 may selectively drive a bullet-shaped cam (not shown) into and out of contact with the park pawl 44 within the confines of a guide cup 50, thereby forcing the park pawl 44 to rotate about the pivot shaft 42.

Figure 5:
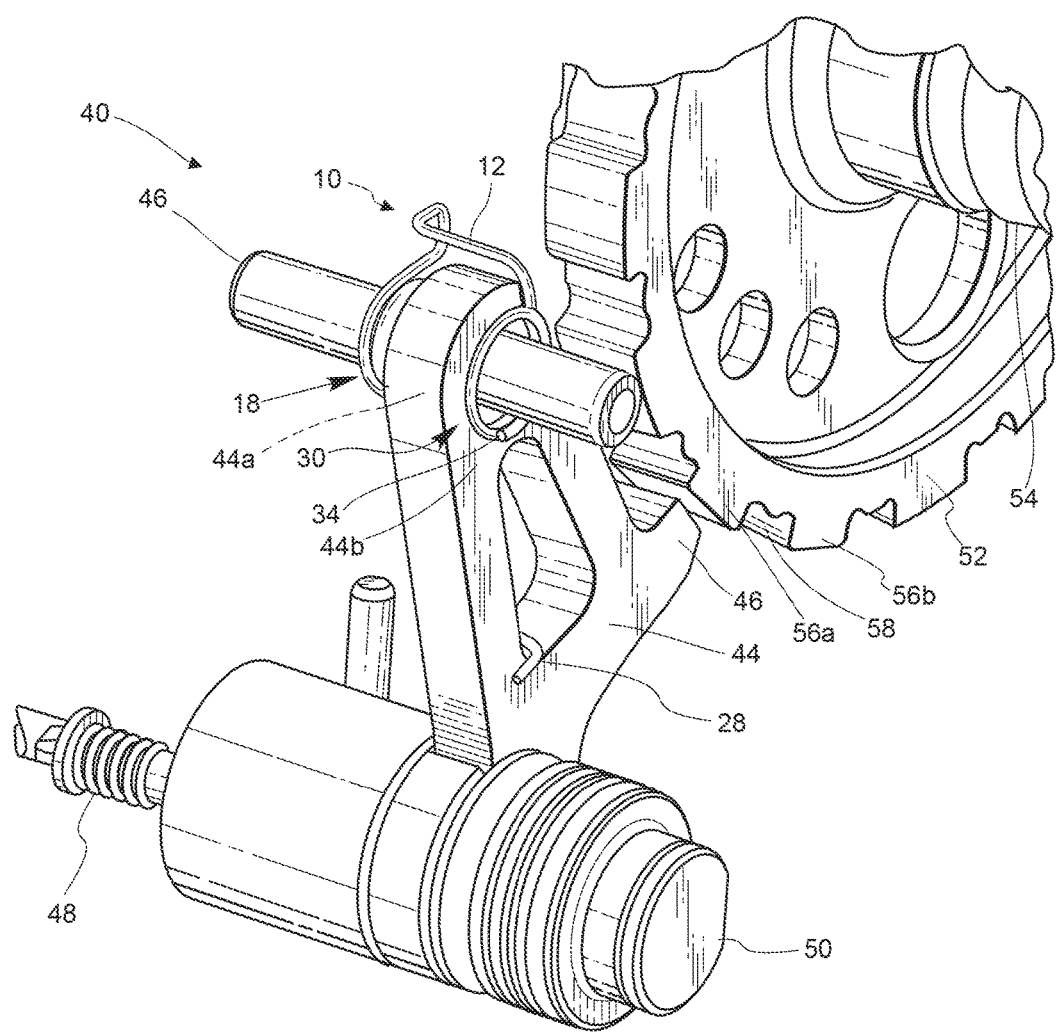
FIG. 5 is a perspective front view of the park brake assembly of FIG. 4 shown with a park gear.

Referring to FIG. 5, the park assembly 40 is disposed in proximity to a park gear 52. The park gear 52 is connected to a transmission output shaft 54, as is known in the art. The park gear 52 includes several peripherally disposed and substantially identical teeth or projections (e.g., teeth 56a, 56b). Each tooth is separated by a recess (e.g., recess 58).

In use, the park rod 48 selectively urges the park pawl 44 in an engagement direction such that the park pawl tooth 46 of the park pawl 44 engages the park gear 52 in, for instance, the recess 58 between the teeth 56a and 56b between the teeth of the park gear 52, thereby substantially preventing the park gear 52 and the transmission output shaft 54 from rotating.

Referring to FIG. 6, a park assembly 40 including a return spring 10 and a park pawl 44 are shown within a portion of a transmission housing 60. The surface contacting portion 12 of the return spring 10 contacts and biases against a surface 62 of the transmission housing 60 to provide the first reaction point. In other approaches, the surface contacting portion 12 of the return spring 10 contacts a pin or other protrusion within the transmission housing 60. In still other approaches, the surface contacting portion 12 of the return spring 10 contacts and biases against any fixed surface within the transmission housing 60.

In this way, the surface contacting portion 12 fixes a first end of the active coil region 18 with respect to a transmission housing 60 to provide the first reaction point and, as previously discussed, the pawl engagement member 24 fixes the second end of the active coil region 18 with respect to the park pawl 44 to provide the second reaction point.

Upon installation of the park assembly 40 in a transmission housing 60, the active coil region 18 of the return spring 10 biases the park pawl 44 out of engagement with the park gear 52 when a vehicle is not in a "parked" position or state. When a vehicle is shifted into "park," torque applied by rotation of the pawl engagement member 24 as the park pawl 44 is driven into the engagement direction causes the coils 20a, 20b, 20c, 20d of the active coil region 18 to deflect due to bending stresses. This deflection of the active coil region 18 assists in returning the park pawl 44 out of engagement with the park gear 52 when a vehicle is shifted from "park" to another drive mode. However, because inactive coil region 30 remains ungrounded due to free end portion 34, torque applied by rotation of the pawl engagement member 24 does not cause the coil 32 of the inactive coil region 30 to deflect.

Advantageously, the active and inactive coil regions 18, 30 disposed on either side of the park pawl 44 maintain proper location of the park pawl 44 along pivot shaft 42 when the park assembly 40 is installed in a recess 64 of the transmission housing 60. That is, the return spring 10 may be provided with the appropriate number of coils for either or both of the active and inactive coil regions 18, 30 such that the park pawl 44 is maintained at a predetermined distance from the sidewalls of the recess 64 of the transmission housing 60 and at a predetermined preload as required to bias the park pawl 44 out of the engaged state while not in "park." The two coil regions may also reduce or eliminate the need for machined surfaces within the recess 64, which would otherwise be necessary to locate the park pawl 44 within the transmission housing 60.

The active and inactive coil regions 18, 30 disposed on either side of the park pawl 44 also maintain proper alignment of the park pawl 44 within the recess 64 of the transmission housing 60. Should the park pawl 44 be subject to twisting forces, for example, during subsequent assembly operations, the inactive coil region 30 provides an axial reaction force to bias the park pawl 44 to its proper alignment.

In addition to the benefits provided by the dual coil regions, the return spring 10 is further improved by inclusion of an inactive coil region as one of the coil regions as compared to, for example, a return spring having two active coil regions. First, design of the return spring 10 may be simplified. Active coil regions are designed to provide a specific torsional force to a park pawl. Reducing the number of active coil regions may alleviate the challenge in designing a return spring that both provides the required torsional force and provides the proper park pawl spacing, as previously discussed.

Second, because the return spring 10 is provided with an inactive coil region 30, installation of the park assembly 40 within the recess 64 of the transmission housing 60 may be improved as compared to, for example, a return spring having two active coil regions. Due to the inactive coil region 30 being ungrounded, an assembly tool need only hold torque in one set of coils (the active coil region 18) on one side of the park pawl 44 (first side 44*a*). An assembly tool used to install the return spring 10 may therefore be thinner as compared to an assembly tool that is required to hold torque in two sets of coils on two sides of a park pawl. A thinner tool may more easily reach within recess 64 of the transmission housing 60, thereby improving installation of the return spring 10.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A pawl return spring, comprising:
   a surface contacting portion adapted to contact a transmission housing, the surface contacting portion comprising a first connection region and a second connection region opposite the first connection region;
   an active coil region connected to the first connection region and disposed about a central longitudinal axis,
   an inactive coil region connected to the second connection region and disposed about the central longitudinal axis, and
   a pawl engagement member connected to the active coil region and adapted to engage a surface of a pawl to ground the active coil region;
   wherein the active coil region comprises a torsion spring configured to deflect under load applied to the pawl engagement member, and wherein the inactive coil region comprises an ungrounded end portion, and wherein the inactive coil region does not deflect under load applied to the pawl engagement member.

2. The pawl return spring of claim 1, wherein the inactive coil region is axially spaced apart from the active coil region along the central longitudinal axis.

3. The pawl return spring of claim 2, wherein the active and inactive coil regions are axially spaced apart to receive a park pawl between the active and inactive coil regions.

4. The pawl return spring of claim 1, wherein the active and inactive coil regions are adapted to receive a pivot shaft coaxially aligned with the active and inactive coil regions.

5. The pawl return spring of claim 1, wherein the surface contacting portion has a longitudinal axis extending in a direction parallel to the central longitudinal axis.

6. A park assembly, comprising:
   a pawl rotatable about a pivot shaft; and
   a pawl return spring adapted to bias the pawl in a disengagement rotary direction, the pawl return spring including
   a surface contacting portion,
   an active coil region connected to the surface contacting portion and disposed about the pivot shaft at a first side of the pawl,
   an inactive coil region connected to the surface contacting portion and disposed about the pivot shaft at a second side of the pawl opposite the first side, and
   a pawl engagement member connected to the active coil region and adapted to engage a surface of the pawl to ground the active coil region,
   wherein the active coil region comprises a torsion spring configured to deflect under load applied to the pawl engagement member, wherein the inactive coil region comprises an ungrounded end portion, and wherein the inactive coil region does not deflect under load applied to the pawl engagement member.

7. The park assembly of claim 6, wherein the surface contacting portion is adapted to ground the pawl return spring to a transmission housing.

8. The park assembly of claim 6, wherein the pawl is rotatable about the pivot shaft in a first rotary direction to engage a park gear and in a second rotary direction to disengage the park gear.

9. The park assembly of claim 8, wherein the pawl return spring is disposed about the pivot shaft and biases the pawl in the second rotary direction to disengage the park gear.

10. The park assembly of claim 8, wherein the active coil region deflects in response to rotation of the pawl in the first rotary direction, and wherein the inactive coil region does not deflect in response to rotation of the pawl in the first or second rotary direction.

11. A method for operating a park mechanism, comprising: using a pawl return spring having an active coil region disposed about a pivot shaft at a first pawl side to bias a pawl in a disengagement direction, and an inactive coil region disposed about the pivot shaft at a second pawl side; and responsive to the pawl rotating in an engagement rotary direction, deflecting the active coil region and not deflecting the inactive coil region.

12. The method of claim 11, further comprising:
   coaxially aligning a central longitudinal axis of the pivot shaft and a common central longitudinal axis of the active and inactive coil regions of the pawl return spring.

13. The method of claim 11, further comprising:
   grounding the active coil region at
   a surface contacting portion connected to the active coil region and adapted to contact a transmission housing, and
   a pawl engagement member connected to the active coil region and adapted to engage a surface of a pawl.

* * * * *